(12) United States Patent
Bedingfield

(10) Patent No.: US 10,397,145 B2
(45) Date of Patent: *Aug. 27, 2019

(54) SYSTEMS AND METHODS FOR AUTOMATICALLY PROVIDING ALERTS OF WEB SITE CONTENT UPDATES

(71) Applicant: AT&T INTELLECTUAL PROPERTY I, L.P., Atlanta, GA (US)

(72) Inventor: James C. Bedingfield, Lilburn, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 735 days.

This patent is subject to a terminal disclaimer.

(21) Appl. No.: 14/665,840

(22) Filed: Mar. 23, 2015

(65) Prior Publication Data
US 2015/0195222 A1    Jul. 9, 2015

Related U.S. Application Data

(63) Continuation of application No. 10/961,870, filed on Oct. 8, 2004, now Pat. No. 8,990,678, which is a continuation-in-part of application No. 09/817,944, filed on Mar. 27, 2001, now abandoned.

(51) Int. Cl.
| | |
|---|---|
| *G06F 16/958* | (2019.01) |
| *G06F 17/22* | (2006.01) |
| *H04L 12/58* | (2006.01) |
| *G06F 16/9535* | (2019.01) |

(52) U.S. Cl.
CPC .......... *H04L 51/04* (2013.01); *G06F 16/958* (2019.01); *G06F 16/9535* (2019.01); *G06F 17/2247* (2013.01)

(58) Field of Classification Search
CPC .......... G06F 17/3089; G06F 17/30867; G06F 16/958; G06F 16/93
See application file for complete search history.

(56) References Cited

U.S. PATENT DOCUMENTS

| | | | | |
|---|---|---|---|---|
| 5,806,078 A | * | 9/1998 | Hug | G06F 17/2288 707/999.202 |
| 5,898,836 A | * | 4/1999 | Freivald | G06F 16/957 709/218 |
| 5,937,160 A | * | 8/1999 | Davis | G06F 16/9558 709/203 |

(Continued)

FOREIGN PATENT DOCUMENTS

JP    2002073455    3/2002

OTHER PUBLICATIONS

Hammersley, "Content Syndication with RSS," O' Reilly & Associates, Inc., Mar. 24, 2003, ISBN 0596003838, pp. 26-41.

(Continued)

*Primary Examiner* — Scott T Baderman
*Assistant Examiner* — Benjamin Smith
(74) *Attorney, Agent, or Firm* — Akerman LLP; Michael K. Dixon; Mammen (Roy) P. Zachariah, Jr.

(57) ABSTRACT

Methods of automatically updating content on a web site, allowing web site visitors to request notification of updates to the content of a web site, and notifying persons of updated content on a web site are disclosed. Update alert tables and systems for implementing the foregoing methods also are disclosed.

20 Claims, 5 Drawing Sheets

(56) References Cited

U.S. PATENT DOCUMENTS

| | | | | |
|---|---|---|---|---|
| 5,978,842 A * | 11/1999 | Noble | G06F 16/957 | 709/218 |
| 5,983,268 A * | 11/1999 | Freivald | G06F 16/957 | 709/218 |
| 6,009,441 A * | 12/1999 | Mathieu | G06F 17/21 | 715/236 |
| 6,012,087 A * | 1/2000 | Freivald | G06F 16/957 | 709/218 |
| 6,076,109 A | 6/2000 | Kikinis | | |
| 6,094,681 A * | 7/2000 | Shaffer | G06Q 10/10 | 709/206 |
| 6,219,818 B1 * | 4/2001 | Freivald | G06F 16/957 | 714/799 |
| 6,243,757 B1 * | 6/2001 | Kanodia | G06F 16/958 | 709/235 |
| 6,272,532 B1 * | 8/2001 | Feinleib | G06Q 10/107 | 709/206 |
| 6,356,903 B1 | 3/2002 | Baxter et al. | | |
| 6,405,245 B1 * | 6/2002 | Burson | G06Q 30/00 | 709/217 |
| 6,434,745 B1 * | 8/2002 | Conley, Jr. | G06Q 30/02 | 707/999.01 |
| 6,442,594 B1 * | 8/2002 | Ouchi | G06Q 10/10 | 709/206 |
| 6,456,308 B1 * | 9/2002 | Agranat | G06F 8/20 | 715/854 |
| 6,464,142 B1 * | 10/2002 | Denenberg | B65G 1/045 | 235/440 |
| 6,633,910 B1 * | 10/2003 | Rajan | G06Q 30/02 | 709/224 |
| 6,636,247 B1 | 10/2003 | Hamzy et al. | | |
| 6,641,037 B2 * | 11/2003 | Williams | G06Q 10/00 | 235/381 |
| 6,700,674 B1 * | 3/2004 | Otsuka | H04N 1/00915 | 358/1.15 |
| 6,735,615 B1 * | 5/2004 | Iwayama | H04L 43/00 | 709/204 |
| 6,785,864 B1 * | 8/2004 | Te | H04L 67/02 | 715/205 |
| 6,823,357 B1 * | 11/2004 | Du | G06F 16/9535 | 709/203 |
| 6,834,306 B1 * | 12/2004 | Tsimelzon | G06F 16/9577 | 709/228 |
| 6,910,071 B2 * | 6/2005 | Quintero | G06F 16/951 | 709/224 |
| 6,944,658 B1 * | 9/2005 | Schneider | G06F 16/9535 | 709/224 |
| 7,058,691 B1 * | 6/2006 | Yu | H04L 67/2847 | 455/456.3 |
| 7,076,439 B1 * | 7/2006 | Jaggi | G06Q 10/063114 | 705/7.15 |
| 7,127,515 B2 * | 10/2006 | Patterson | H04L 51/28 | 709/229 |
| 7,127,670 B2 * | 10/2006 | Bendik | G06F 17/248 | 715/200 |
| 7,177,881 B2 * | 2/2007 | Schwesig | G11B 27/031 | |
| 7,237,200 B2 * | 6/2007 | Wisniewski | H04L 51/14 | 715/234 |
| 7,284,035 B2 * | 10/2007 | Yu | H04L 67/2847 | 455/405 |
| 7,327,834 B1 | 2/2008 | Hiers et al. | | |
| 7,346,547 B2 * | 3/2008 | Yamaguchi | G06Q 20/10 | 705/26.1 |
| 7,370,315 B1 * | 5/2008 | Lovell | G06F 8/33 | 715/763 |
| 7,421,454 B2 * | 9/2008 | DeShan | G06Q 30/02 | |
| 7,426,687 B1 * | 9/2008 | Schultz | G06F 16/9566 | 715/208 |
| 7,433,876 B2 * | 10/2008 | Spivack | G06F 16/958 | |
| 7,487,441 B2 * | 2/2009 | Szeto | G06F 3/0482 | 715/234 |
| 7,559,022 B2 * | 7/2009 | Wisniewski | H04L 51/14 | 715/234 |
| 7,599,938 B1 * | 10/2009 | Harrison, Jr. | G06Q 30/02 | 705/7.29 |
| 7,634,535 B2 * | 12/2009 | Watson | G06Q 50/22 | 709/203 |
| 7,640,322 B2 * | 12/2009 | Wendkos | H04L 51/12 | 709/206 |
| 7,698,276 B2 * | 4/2010 | Seshadri | G06F 16/9535 | 719/318 |
| 7,797,306 B1 | 9/2010 | Pather et al. | | |
| 7,810,027 B2 * | 10/2010 | Bendik | G06F 17/248 | 715/255 |
| 7,823,057 B1 * | 10/2010 | Schultz | G06F 16/9566 | 715/229 |
| 8,020,106 B2 * | 9/2011 | Diab | G06F 16/954 | 715/760 |
| 8,990,678 B2 * | 3/2015 | Bedingfield, Sr. | G06F 17/2247 | 715/234 |
| 2002/0013825 A1 * | 1/2002 | Freivald | G06F 16/957 | 709/218 |
| 2002/0046224 A1 * | 4/2002 | Bendik | G06F 17/248 | 715/200 |
| 2002/0178164 A1 * | 11/2002 | Wisniewski | H04L 51/14 | |
| 2002/0184359 A1 | 12/2002 | Kaneko et al. | | |
| 2003/0028608 A1 * | 2/2003 | Patterson | H04L 51/28 | 709/207 |
| 2003/0079041 A1 * | 4/2003 | Parrella, Sr. | H03M 7/30 | 709/247 |
| 2004/0019499 A1 * | 1/2004 | Murashita | G06F 16/951 | 705/1.1 |
| 2004/0068481 A1 * | 4/2004 | Seshadri | G06F 16/9535 | |
| 2004/0199871 A1 * | 10/2004 | Lee | G06F 3/0489 | 715/205 |
| 2004/0205604 A1 * | 10/2004 | Read | G06F 17/24 | 715/234 |
| 2005/0010635 A1 * | 1/2005 | Schwesig | G11B 27/031 | 709/203 |
| 2005/0050460 A1 * | 3/2005 | Bedingfield, Sr. | G06F 17/2247 | 715/205 |
| 2005/0086384 A1 * | 4/2005 | Ernst | H04L 12/00 | 709/248 |
| 2005/0108363 A1 * | 5/2005 | Torigoe | G06F 16/9535 | 709/218 |
| 2005/0193010 A1 * | 9/2005 | DeShan | G06Q 30/02 | |
| 2005/0216439 A1 * | 9/2005 | Kawakita | G06F 16/958 | |
| 2005/0228899 A1 * | 10/2005 | Wendkos | H04L 51/12 | 709/232 |
| 2006/0004703 A1 * | 1/2006 | Spivack | G06F 16/958 | |
| 2006/0026304 A1 * | 2/2006 | Price | G06F 8/65 | 710/8 |
| 2006/0072721 A1 * | 4/2006 | Wisniewski | G06Q 10/107 | 379/88.22 |
| 2006/0195778 A1 * | 8/2006 | Bendik | G06F 17/248 | 715/209 |
| 2006/0230021 A1 * | 10/2006 | Diab | G06F 16/954 | |
| 2007/0233748 A1 * | 10/2007 | Chang | G06F 16/957 | |
| 2007/0233799 A1 * | 10/2007 | Wisniewski | H04L 51/14 | 709/206 |
| 2007/0250767 A1 * | 10/2007 | Wisniewski | H04L 51/14 | 715/234 |
| 2008/0028300 A1 * | 1/2008 | Krieger | G06Q 10/10 | 715/255 |
| 2015/0195222 A1 * | 7/2015 | Bedingfield | G06F 17/3089 | 709/206 |

OTHER PUBLICATIONS

Keller et al., "An Exploration of Web-based Monitoring: Implications for Design," ACM 2007, pp. 377-386.

Challenger et al., "Efficiently Serving Dynamic Data At Highly Accessed Web Sites," Apr. 2004, IEEE Press, pp. 233-246.

Bunch et al., "Software Agents for Process Monitoring and Notification," ACM 2004, pp. 94-99.

(56) References Cited

OTHER PUBLICATIONS

Waldman et al., "The Architecture of Robust Publishing Systems," ACM 2001, pp. 199-230.
Osborn, "Using Webpages to Make Your Life Easier," ACM 2001, pp. 123-128.
Aycock et al., "An Architecture for Easy Web Page Updating," ACM 1999, pp. 1-10.

* cited by examiner

110

| WEB PAGE URL | UPDATE ALERT RECIPIENTS |
|---|---|
| http://www.obay.com/84321 | joe@bellsouth.net<br>suzie@bellsouth.net |
| http://xyztimes.com | bill@bellsouth.net |
| bellsouth.com/promos/specialoffers.htm | jim@bellsouth.com<br>steve@bellsouth.net |

Fig. 5

SYSTEMS AND METHODS FOR AUTOMATICALLY PROVIDING ALERTS OF WEB SITE CONTENT UPDATES

CROSS-REFERENCE TO RELATED APPLICATION

This application is a continuation of and claims priority to U.S. application Ser. No. 10/961,870, filed Oct. 8, 2004, which is a continuation-in-part of U.S. application Ser. No. 09/817,944, filed Mar. 27, 2001, both of which are herein incorporated by reference in their entireties.

FIELD OF THE INVENTION

The inventions relate to systems and methods for updating content on a web site and providing automatic alerts that content has been updated.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

Web sites today often have numerous pages and contain large amounts of content in the form of graphics, text, links, banner advertising, and the like. Maintaining this content current and up-to-date can therefore become quite demanding. The process of manually accessing and evaluating the content on each page can be both tedious and time-consuming, and therefore easily put aside by web site owners/administrators who are pressed for time and resources. Nonetheless, for many web site owners/administrators (such as a small business owners) maintaining the content on one's web site current can be quite important. Therefore, a method that would automatically access one's web site and present content to the web site owners/administrators for periodic review would encourage the web site owners/administrators to maintain their web sites current while easing the burden of doing so at the same time. Further, once content on a web site is updated, there is a need for an efficient way of alerting or notifying persons or even other computers that updated content is available.

SUMMARY OF THE INVENTION

Illustrative embodiments of systems and methods for alerting persons or other computers that updated web site content is available are shown and described. One such illustrative embodiment is a method for alerting users of updates to web site content that includes the steps of receiving a request from a user to be notified of updates, detecting an update, and sending an alert message notifying the user of an update. The request may include a universal resource locator (URL) of a web page. The request may also include an address to which an alert is to be sent. Another illustrative embodiment is a machine-readable medium with stored data and instructions, which, when executed, receive a request from a user to be notified of an update, detects an update, and sends an alert message notifying the user of an update. A further illustrative embodiment is an apparatus that includes an updating server with updating process and update alerting process modules, an interface to a web hosting server that hosts a web site having content residing on it, and an interface to a user. The updating server receives a request from a user to be notified of an update, detects an update, and sends an alert message notifying the user of an update.

BRIEF DESCRIPTION OF THE DRAWINGS

These and other features, aspects, and advantages of the present embodiment of the invention will become better understood with regard to the following description, appended claims, and accompanying drawings where:

FIG. 5 is an exemplary logical representation of the contents of an update alert table.

DETAILED DESCRIPTION OF ILLUSTRATIVE EMBODIMENTS

Figure 1:
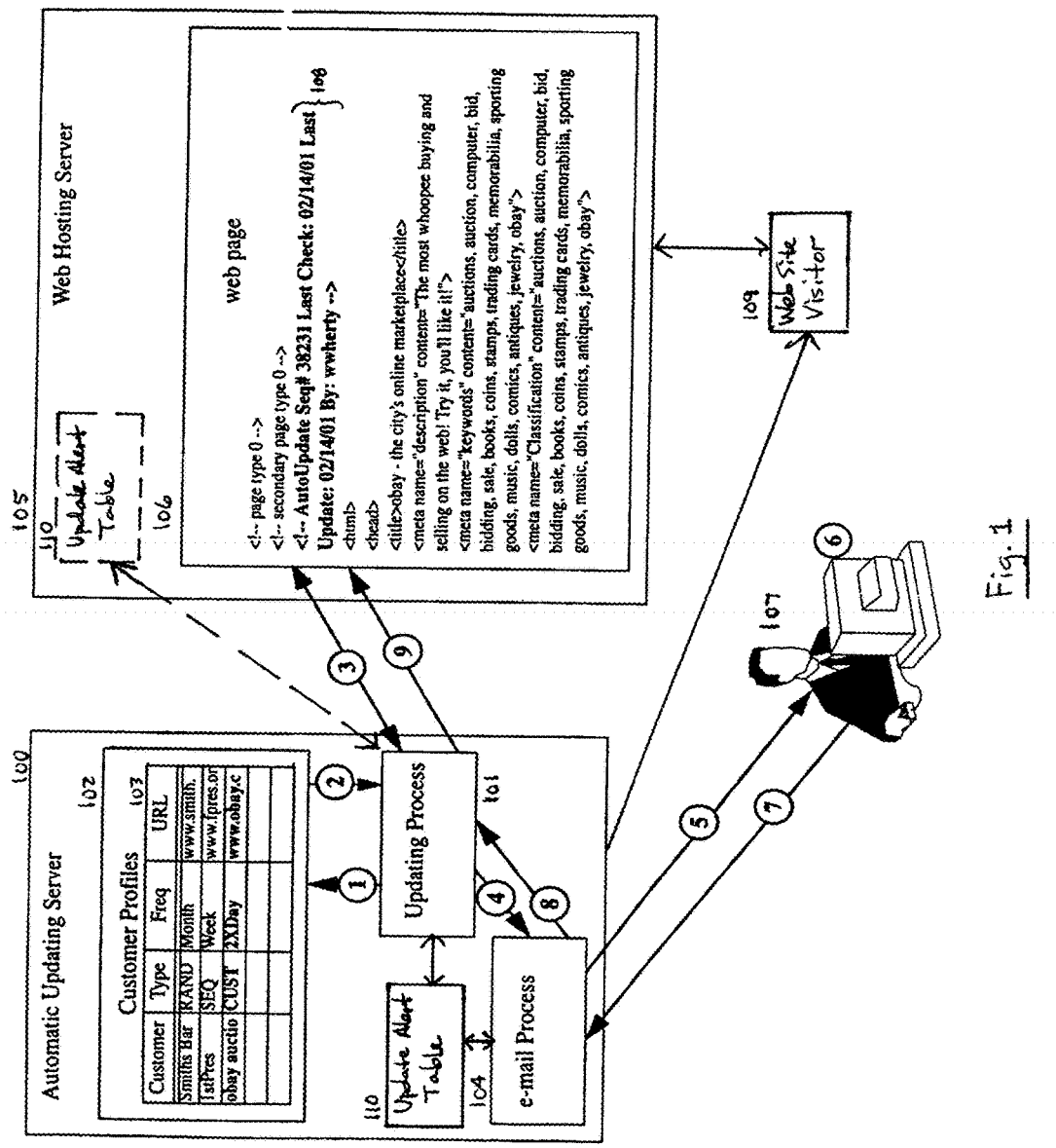
FIG. 1 is a block diagram depicting a computer running executable code in one exemplary embodiment of the invention.

Throughout the following detailed description similar reference numbers refer to similar elements in all the FIGS. of the drawings. FIG. 1 is a block diagram depicting a computer 100 running executable code or software 101, 104 in one embodiment of the invention. Computer 100 is a typical server with non-volatile memory 102. Residing in memory 102 are a plurality of programmable update profiles or customer profiles 103. Each customer who wishes to have content 106 on his or her web site automatically updated by server 100 has their own profile or row in the table of customer profiles 103. The fields comprising each update profile are a named party or customer, an update type, an update frequency, a named party uniform resource locator or URL, a named party e-mail address, and the like. The named party field identifies the owner or administrator of a web site. The named party URL identifies the address of the named party's web hosting server 105 on the public or a private internet. The update frequency identifies how often the named party wants updating process 101 to access the named party's web site and select content to be updated. Typical frequencies might be twice daily, daily, weekly, monthly, or the like.

The update type identifies how the named party wants updating process 101 to select content to be updated after updating process 101 accesses the named party's web site. Typical update types might be random (RAND), sequential (SEQ), custom (CUST), and the like. If a named party specifies a random update type, updating process 101 accesses the named party's web site using the named party's URL and randomly selects content from at least one web page 106 on the named party's web hosting server 105. If a named party specifies a sequential update type, updating process 101 accesses the named party's web site using the named party's URL and sequentially selects content from at least one web page 106 on the named party's web hosting server 105. Updating process could sequentially select content from a single web page 106 or sequentially step through multiple pages selecting content from each page 106 when accessed. If a named party specifies a custom update type, updating process 101 accesses the named party's web site using the named party's URL and selects content from at least one web page 106 in a manner specifically set out by the named party when creating or revising his or her update profile. For instance, the named party could specify that content from only certain pages such as the homepage or frequently accessed pages be selected for updating. The named party may also specify that only certain graphics and/or text be selected for updating. Any number of combinations are possible.

Once updating process 101 determines that it is time to access a named party's web site 105 and selects the appropriate content, updating process 101 passes a copy of the selected content and the named party's e-mail address to e-mail process 104. E-mail process 104 creates an e-mail message to the named party informing him or her that it is time to update content on his or her web site, and appends a copy of the selected content to the e-mail message as an attachment or attachments. When the named party 107 receives the e-mail message from e-mail process 104 he or she opens the message and decides whether to update the attached content. If the named party decides to update the content he or she does so by revising the copy of the selected content in the attachment, which includes replacing the attachment with new content, and sending a reply message back to e-mail process 104. If the named party decides not to update the content he or she simply sends a reply message to e-mail process 104 with no changes to the attachment. If the named party does not reply to the e-mail from e-mail process 104, in one embodiment of the invention updating process 101 will ignore the lack of response and continue to generate e-mail messages to the named party in accordance with the named party's update profile 103. In another embodiment of the invention, if the named party fails to reply to the e-mail message from e-mail process 104 updating process 101 will send reminder e-mails to the named party until he or she responds. Whether updating process 101 ignores a lack or response or sends reminder e-mails, and the frequency and/or number of reminder e-mails, may be an option specified in the named party's update profile 103.

Upon receipt of a reply message from named party 107 e-mail process 104 passes the attachment containing the revised copy of the selected content to updating process 101. Upon receipt of the attachment from e-mail process 104 updating process 101 updates the named party's web site 105 and an update log 108 (contained in the remarks section of at least one web page 106 for example) based on the changes to the revised copy of the selected content, if any. Update log 108 contains information such as an automatic update sequence number (AutoUpdate Seq #) field, a last checked date field, a last updated date field, a last updated by field, and the like. E-mail process 104 may constitute any of a number of e-mail packages such as MICROSOFT OUTLOOK, EUDORA, or the like. If e-mail process 104 supports rich text formatting of e-mail messages then updating process 101 can update the formatting of textual content on the named party's web site by mapping the rich text format to hypertext markup language or HTML.

An update alert table 110 may reside on automatic updating server 100 as well in particular embodiments of the inventions. While update alert table 110 may take any number of forms, FIG. 5 is an exemplary logical representation of the contents of an update alert table in one embodiment of the invention. One ordinarily skilled in the art will recognize that, among many other things, additional information could be included in update alert table 110 and that update alert table 110 could reside in places other than automatic updating server 100 itself. For instance, an update alert table particular to the web site or web sites located on a web hosting server (e.g., web hosting server 105) could reside on the web hosting server as well and be accessed by the processes running on automatic updating server 100 as needed by way of a communications or data link. In exemplary update alert table 110, e-mail addresses for update alert recipients associated with a particular web page url are shown. For example, the e-mail addresses joe@bellsouth.net and suzie@bellsouth.net are associated with web page url www.obay.com/84321. Additional entries in the table are made as needed or requested. In addition, the means of communicating that content on a web page has been updated to an update alert recipient need not be via e-mail or involve an internet. For instance, an update alert recipient could specify that update alerts be delivered via instant message, page, or the like, and an update alert could be sent via an intranet, instant messaging network, paging network, or the like.

Figure 2:
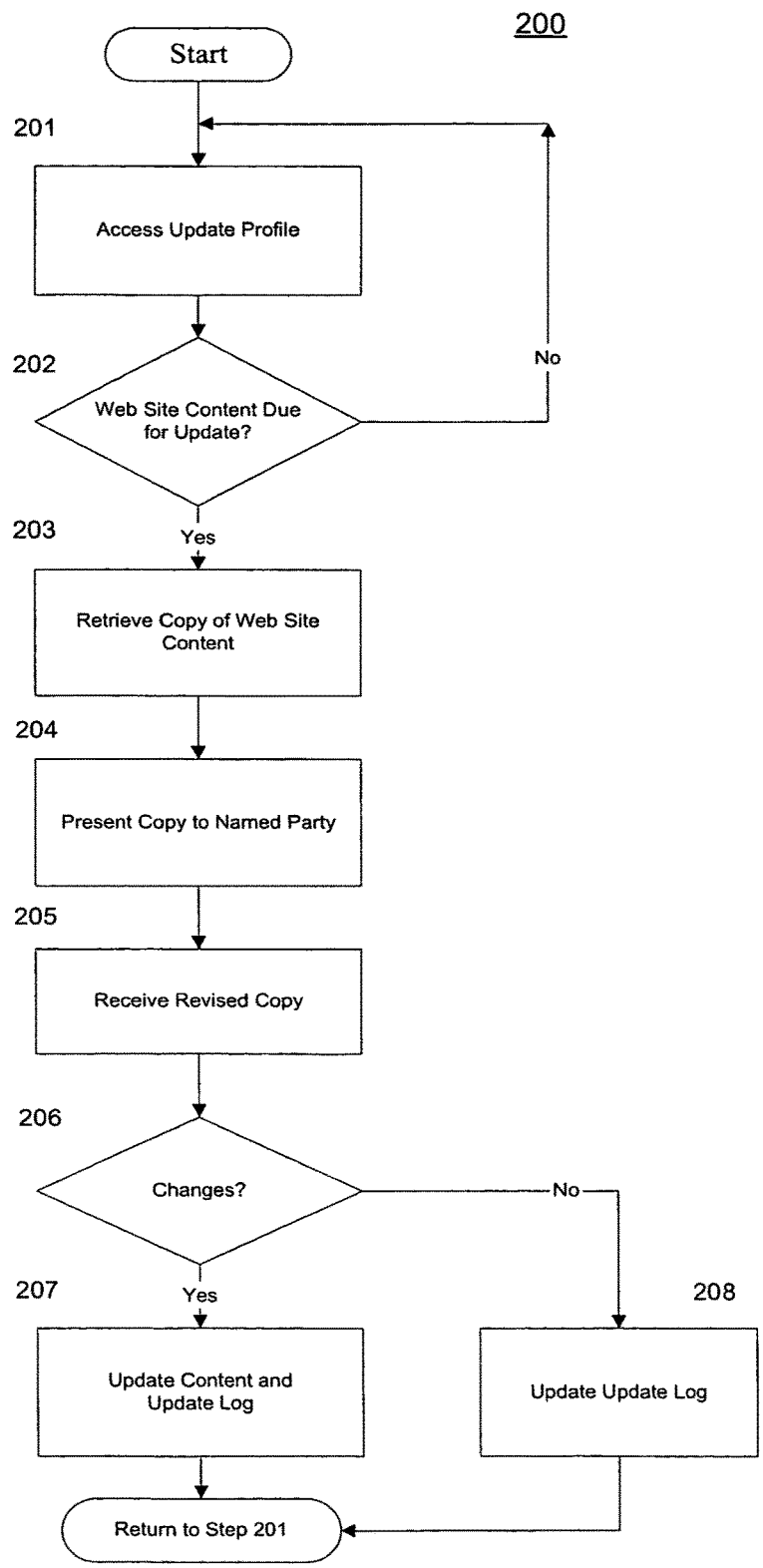
FIG. 2 is a flow chart depicting the steps performed in one exemplary embodiment of the invention.

FIG. 2 is a flow chart depicting the steps in process 200, another embodiment of the invention. In step 201 the process accesses a named party's update profile. In step 202 the process determines whether any content on the named party's web site is due for an update. If no content is due to be updated the process returns to step 201. If content is due to be updated, in step 203 the process 101 retrieves a copy of the web site content to be updated based on the named party's URL. In another embodiment of the invention, the process may retrieve a copy of the web site content to be updated based on the named party's URL and a specified update type. In step 204, the process presents the copy of the web site content to the named party for review. In step 205, the process receives a revised copy of the content from the named party. In another embodiment of the invention, the copy of the web site content is presented to the named party as an attachment to an e-mail message sent to the named party by the process, and the revised copy of the web site content is received from the named party as an attachment to a reply e-mail sent to the process by the named party. In step 206 the process determines whether the revised copy of the content contains any changes to the content on the named party's web site. If there are changes to the content, in step 207 the process updates the content on the named party's web site to reflect the changes. In step 207 the process also updates an update log to reflect changes in an automatic update sequence number, a last checked date field, a last updated date field, a last updated by field, and the like. If no changes to the content are detected in step 206, in step 208 the process updates the update log to reflect changes in only the automatic update sequence number and the last checked date field.

Figure 3:
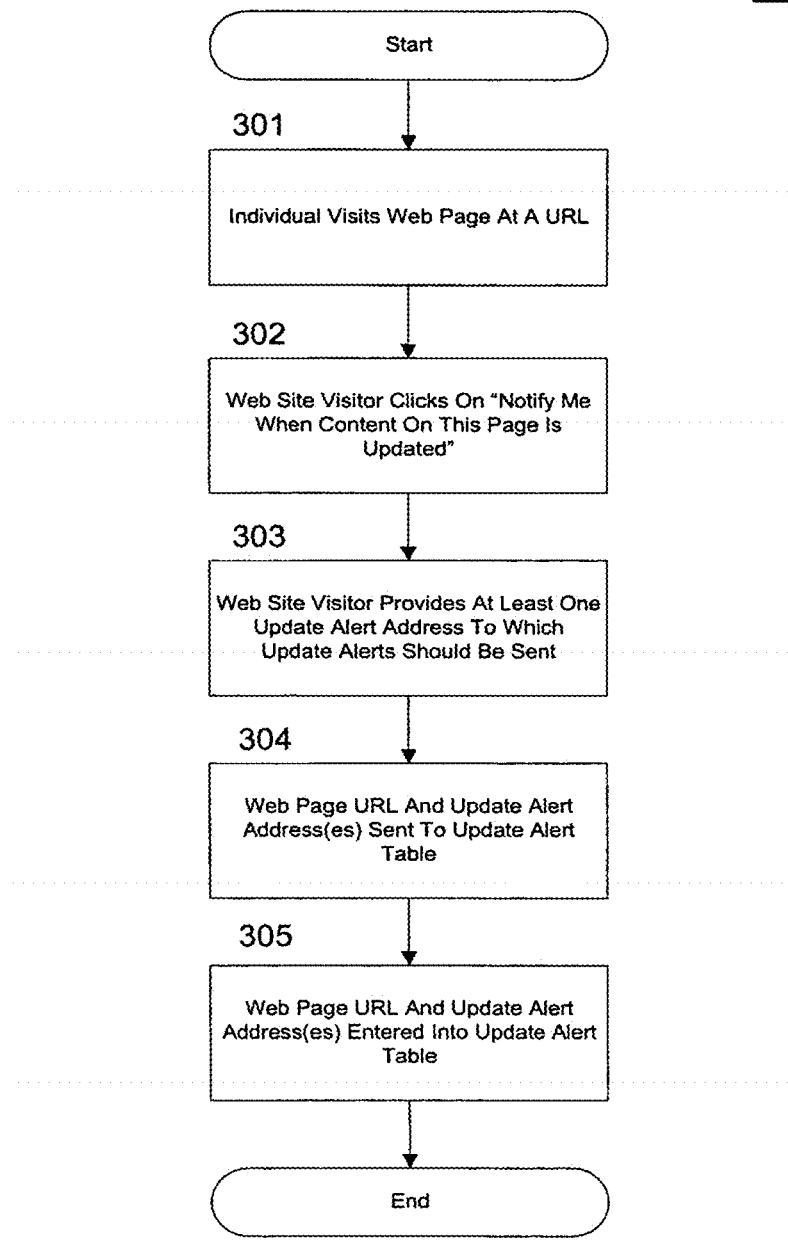
FIG. 3 is a flow chart depicting exemplary steps performed in specifying alert message recipients who desire notification of updated web site content.

FIG. 3 is a flow chart depicting the steps in process 300 in one illustrative embodiment of a particular aspect of the invention. While one of ordinary skill in the art will recognize that there are numerous ways in which an update alert table such as that shown and described in connection with FIG. 5 may be populated and revised, process 300 is one particularly attractive manner of doing so. In step 301 an individual visits a web page located by a url, the web page having a "notify me when content on this page is updated" or other such link thereon. The individual could of course be a natural person, but also could be or include a computer or automated process. In step 302 the web site visitor clicks on the "notify me" or other such link and is presented with a means of providing an update alert address or addresses to which update alerts should be sent. The update alert address may be, for example, an email address, an instant messaging address, a url address, an IP address, or any other type of address that a message or alert could be directed to. In step 303, the web site visitor provides at least one update alert address. In step 304 the update alert address(es) provided and associated web page url are sent to the location where the update alert table for the particular web site or page resides or is to be built. Finally, in step 305 the update alert address(es) and associated web page url are entered into the update alert table.

Figure 4:
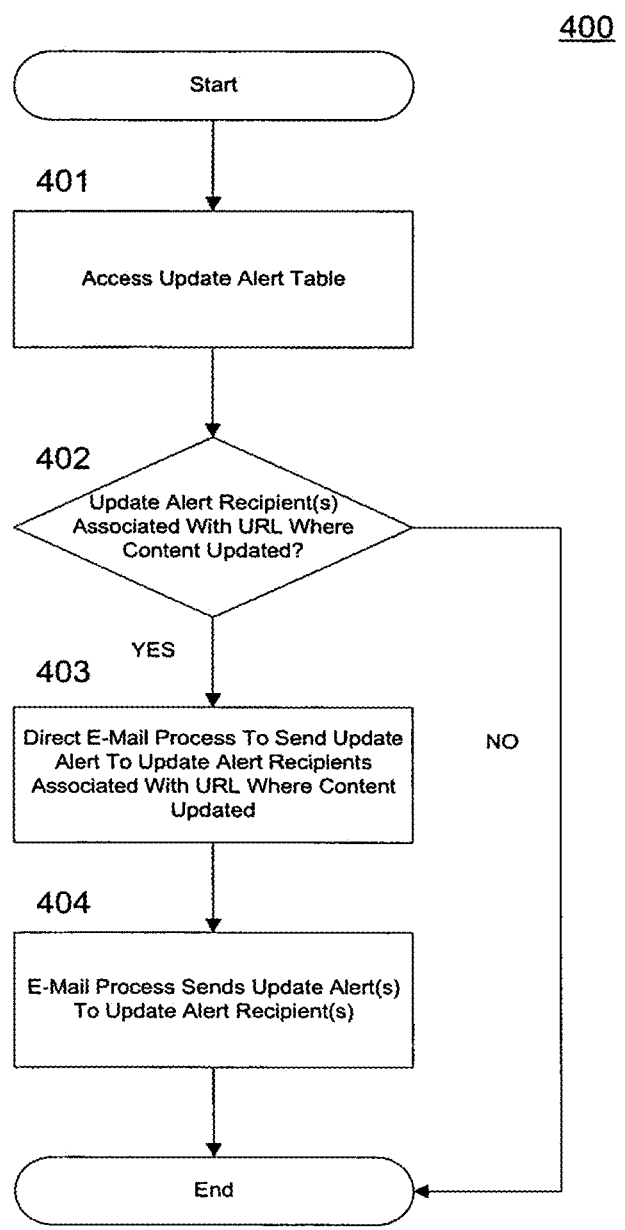
FIG. 4 is a flow chart depicting exemplary steps performed in processing an alert message to notify recipients of the availability of updated web site content.

FIG. 4 is a flow chart depicting the steps in process 400, which is but one of the many possible embodiments of implementing the update alert communication aspects of the invention. Rather than returning to step 201 after step 207 in process 200 described above (FIG. 2), in step 401 the process accesses an update alert table associated with the web page url updated in step 207. In step 402 process 400 determines whether there are any update alert recipients associated with the web page url that has been updated. If NO, process 400 ends. If YES, in step 403 process 400 directs a messaging process, such as the e-mail process 104 in FIG. 1, to send an update alert to each of the update alert recipients associated with the web page url in the update alert table. Finally, in step 404 the messaging process sends the update alerts to the update alert recipients. It will be understood that process 400 need not be run immediately after process 200. It will also be understood that process 400 need not be run in conjunction with process 200 at all, but run entirely independent of process 200 with the addition of a step to determine whether any web page urls in the update alert table have been updated.

While the invention has been described in connection with the embodiments depicted in the various figures, it is to be understood that other similar embodiments may be used or modifications and additions may be made to the described embodiments for performing the same function of the invention without deviating therefrom. For example, automatic updating server 100 could be part of web hosting server 105, e-mail process 104 could reside on a server separate from automatic updating server 100, and customer profiles 103 need not reside in memory 102 but could comprise a web page on each named party's web server 105. Moreover, updating process 101 could be built as a client that runs each time a named party boots up his or her personal computer, examines the named party's web site via a resident web browser, and provides pop-up or on-screen reminders when content is due to be updated. Therefore, the invention should not be limited to any single embodiment, but rather construed in breadth and scope in accordance with the appended claims.

What is claimed:

1. A system, comprising:
a memory that stores instructions; and
a process that executes the instructions to perform operations, the operations comprising:
transmitting a first message containing a copy of first selected content of web site content to a plurality of visitors of a web site, wherein the plurality of visitors comprise computers;
specifying an option in an update profile of a visitor of the plurality of visitors for ignoring a lack of response to the first message;
ignoring, from the visitor of the plurality of visitors, the lack of response to the first message, wherein the lack of response to the first message is ignored based on the option specified in the update profile of the visitor;
transmitting a second message to the visitor in accordance with the update profile, wherein the second message is associated with updating second selected content of the web site content;
updating the web site content based on a revised copy of the second selected content that is received in response to the second message;
receiving requests from visitors of the plurality of visitors to be notified of an update of the website content;
generating an instant message including an alert message indicating the update of the web site content;
transmitting, after updating the web site content, the instant message including the alert message to each of the plurality of visitors that have requested to be notified of the update of the web site content, wherein the alert message indicates that the update has been performed; and
updating, upon receipt of the revised copy of the second selected content, an update log based on changes to the revised copy of the second selected content and to indicate changes in an automatic update sequence number field of the update log, wherein the update log is contained within a web page of the web site updated based on the revised copy of the second selected content.

2. The system of claim 1, wherein the operations further comprise receiving a plurality of requests from the plurality of visitors to be notified of the update to the web site content.

3. The system of claim 1, wherein the operations further comprise receiving, if the response to the first message is received, a revised copy of the first selected content of the web site content.

4. The system of claim 3, wherein the operations further comprise updating, if the response to the first message is received, the web site content based on the revised copy of the first selected content and the revised copy of the second selected content.

5. The system of claim 1, wherein the operations further comprise receiving the revised copy of the second selected content.

6. The system of claim 1, wherein the operations further comprise determining each of the plurality of visitors that have requested to be notified of the update.

7. The system of claim 1, wherein the operations further comprise updating the update log for the web site in response to the updating the web site content.

8. The system of claim 1, wherein the operations further comprise accessing the update profile of the visitor.

9. The system of claim 1, wherein the operations further comprise determining whether the revised copy of the second selected content contains any changes to the web site content.

10. A method, comprising:
transmitting a first message containing a copy of first selected content of web site content to a plurality of visitors of a web site, wherein the plurality of visitors comprise computers;
specifying an option in an update profile of a visitor of the plurality of visitors for ignoring a lack of response to the first message;
ignoring, from the visitor of the plurality of visitors, the lack of response to the first message, wherein the lack of response to the first message is ignored based on the option specified in the update profile of the visitor;

transmitting a second message to the visitor in accordance with the update profile, wherein the second message is associated with updating second selected content of the web site content;

updating, by utilizing instructions from a memory that are executed by a processor, the web site content based on a revised copy of the second selected content that is received in response to the second message;

receiving requests from visitors of the plurality of visitors to be notified of an update of the website content;

generating an instant message including an alert message indicating the update of the web site content;

transmitting, after updating the web site content, the instant message including the alert message to each of the plurality of visitors that have requested to be notified of the update of the web site content, wherein the alert message indicates that the update has been performed; and updating, upon receipt of the revised copy of the second selected content, an update log based on changes to the revised copy of the second selected content and to indicate changes in an automatic update sequence number field of the update log, wherein the update log is contained within a web page of the web site updated based on the revised copy of the second selected content.

11. The method of claim 10, further comprising receiving a plurality of requests from the plurality of visitors to be notified of the update to the web site content.

12. The method of claim 11, further comprising receiving, with the plurality of requests, addresses to which to send the alert message.

13. The method of claim 10, further comprising receiving, if the response to the first message is received, a revised copy of the first selected content of the web site content.

14. The method of claim 13, further comprising updating, if the response to the first message is received, the web site content based on the revised copy of the first selected content and the revised copy of the second selected content.

15. The method of claim 10, further comprising determining whether the revised copy of the second selected content contains any changes to the web site content.

16. The method of claim 10, further comprising determining each of the plurality of visitors that have requested to be notified of the update.

17. The method of claim 10, further comprising determining whether the web site is due for receiving the update.

18. The method of claim 10, further comprising updating the update log for the web site in response to the updating the web site content.

19. The method of claim 10, further comprising storing addresses for receiving the alert message in an alert table.

20. A non-transitory machine-readable medium comprising instructions, which, when loaded and executed by a processor, cause the processor to perform operations, the operations comprising:

transmitting a first message containing a copy of first selected content of web site content to a plurality of visitors of a web site, wherein the plurality of visitors comprise computers;

specifying an option in an update profile of a visitor of the plurality of visitors for ignoring a lack of response to the first message;

ignoring, from the visitor of the plurality of visitors, the lack of response to the first message, wherein the lack of response to the first message is ignored based on the option specified in the update profile of the visitor;

transmitting a second message to the visitor in accordance with the update profile, wherein the second message is associated with updating second selected content of the web site content;

updating the web site content based on a revised copy of the second selected content that is received in response to the second message;

receiving requests from visitors of the plurality of visitors to be notified of an update of the website content;

generating an instant message including an alert message indicating the update of the web site content;

transmitting, after updating the web site content, the instant message including the alert message to each of the plurality of visitors that have requested to be notified of the update of the web site content, wherein the alert message indicates that the update has been performed; and updating, upon receipt of the revised copy of the second selected content, an update log based on changes to the revised copy of the second selected content and to indicate changes in an automatic update sequence number field of the update log, wherein the update log is contained within a web page of the web site updated based on the revised copy of the second selected content.

* * * * *